United States Patent [19]

Gdaniec et al.

[11] Patent Number: 4,636,948

[45] Date of Patent: Jan. 13, 1987

[54] METHOD FOR CONTROLLING EXECUTION OF APPLICATION PROGRAMS WRITTEN IN HIGH LEVEL PROGRAM LANGUAGE

[75] Inventors: Joseph M. Gdaniec, Hyde Park; Richard J. Sahulka, Woodstock; David B. Soll, Monroe, all of N.Y.

[73] Assignee: International Business Machines Corporation, Armonk, N.Y.

[21] Appl. No.: 696,278

[22] Filed: Jan. 30, 1985

[51] Int. Cl.$^4$ ............................................. G06F 9/00
[52] U.S. Cl. ................................................... 364/300
[58] Field of Search ................. 364/200 MS File, 300

[56] References Cited

U.S. PATENT DOCUMENTS 4,229,790 10/1980 Gilliland et al. .................... 364/200
4,412,286 10/1983 O'Dowd et al. ..................... 364/200

OTHER PUBLICATIONS

John L. Larson—"Multitasking on the Cray X-MP-2 Multiprocessor" Computer, vol. 17, No. 7, Jul., 1984, p. 62.
Harry F. Jordan—"Performance Measurements on HEP—A Pipelined MIMD Computer", 10th Annual International Conference on Computer Architecture, Conference Proceedings, Stockholm, Sweden, Jun. 13-17, 1983, p. 207.
Application Program Performance Extender, I.B.M. Corporation, 1984, pp. 1-175.

Primary Examiner—Raulfe B. Zache
Attorney, Agent, or Firm—George E. Clark

[57] ABSTRACT

A method for executing application programs written in a high level program language on tightly coupled multiprocessor systems in a Multiple Instruction/Multiple Data (MIMD) environment includes the steps of: initializing a MIMD environment in a data processing system by a call to an initialization routine from an application program; maintaining the MIMD environment until all independently executable portions of the application program have been executed; scheduling execution of those tasks representing independently executable portions of the application program; synchronizing execution and completion of the tasks until all tasks have completed execution; terminating the MIMD environment on completion of all the tasks.

5 Claims, 5 Drawing Figures

FIG. 1  AAA INITIALIZATION SCENARIO

FIG.3 AAA CONTROL BLOCK STRUCTURE AFTER INIATIALIZATION

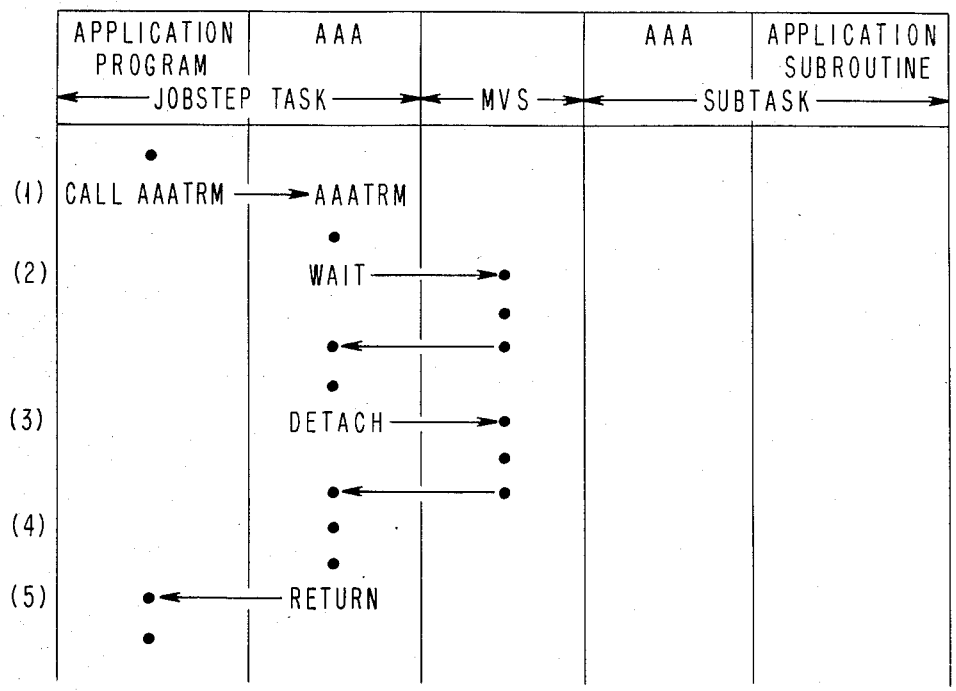

METHOD FOR CONTROLLING EXECUTION OF APPLICATION PROGRAMS WRITTEN IN HIGH LEVEL PROGRAM LANGUAGE

BACKGROUND OF THE INVENTION

1. Field of the Invention

The present invention relates to data processing systems and more particularly to methods for improving efficiency of execution of application programs written in high level program language.

Currently, single large FORTRAN application programs cannot utilize the full computational capability of tightly coupled multiprocessing (MP) configurations to achieve minimum turn-around time. This limitation is due to the Single Instruction/Single Data (SISD) environment which is currently provided for FORTRAN application programs. The SISD environment limits the FORTRAN application programs to using only one of the processors of an MP configuration at any instant of time.

The Multiple Instruction Multiple Data (MIMD) environment permits a single FORTRAN application program to use all the processors of an MP configuration concurrently and thus utilize the configuration's full computational capability.

FORTRAN, the primary programming language for Scientific and Engineering applications, has to date provided no programming language standard for MIMD execution. Standard FORTRAN application programs can only execute in SISD mode. Therefore a single program, written in FORTRAN, cannot utilize more than one processor when executing on a tightly-coupled multiple processor (MP) system.

The method of the present invention provides MIMD support for application programs written in FORTRAN or other similar languages. This support allows a single program to be structured into computationally independent sections which can execute in parallel by utilizing additional processors of a tightly coupled MP configuration. The MIMD operation can improve application turn-around time by allowing more intensive use of the computational facilities of the MP configuration. The method of the present invention allows such parallel execution on tightly-coupled MP configurations, without requiring system, hardware or language extensions.

2. Description of the Prior Art

The following are systems representative of the prior art.

Application Program Performance Extender (IBM Program Number 5798-DNL) running on an IBM 308X Data Processing System FORTRAN Interface routines described in an article entitled "Multitasking on the Cray X-MP-2 Multiprocessor" Computer, Vol. 17 No. 7, July 1984, p 62.

FORTRAN language extensions described in an article entitled "Performance Measurements on HEP- A Pipelined MIMD Computer" 10th Annual International Conference on Computer Architecture, Conference Proceedings, Stockholm Sweden, June 13-17, 1983, page 207.

Special-purpose hardware configurations:
The IBM 3838 Array Processor, attached to a host processor
The Floating Point Systems Inc. (FPS) array processors, attached to a host processor
Two Digital Equipment Corp. VAX 11/780 machines with a Dual Port Memory Subsystem All of these systems provide some FORTRAN access to parallel processing capability. The Application Program Performance Extender running on an IBM 308X Data Processing System includes task management functions, work queue management functions and task synchronization functions to permit COBOL or FORTRAN application programs to be run on tightly coupled multiprocessor systems with significant reduction in total processing time.

Several differences exist between the operation of the Application Program Performance Extender (APPE) and the method according to the present invention.

The Application Program Performance Extender operates by invoking single MVS multi-tasking related functions under direct command of the application program. Interrelationships between these functions must be managed by the application program. APPE also operates by passing arguments for all work in a given task as part of the ATTACH macro. In addition, APPE operates on application program-supplied data areas for its own internal parameters.

The method of the present invention operates by invoking a number of MVS multi-tasking related functions and managing their interrelationship automatically. It also builds the argument list for each piece of work to be performed by a task at execution time. In addition, it operates using its own internal data areas only. No application program supplied data areas are required.

The X-MP-2 MIMD environment is similar to the APPE system in that it provides low level constructs to allow concurrency and requires that the application program manage the relationships between these constructs.

The IBM 3838 and the FPS array processors are additional, special purpose hardware devices attached to a general purpose host processor. These devices can only be used by programs which have been specially coded for their use and cannot be used by other general data processing programs which may be run on the host processor.

The Denelcor HEP and the two VAX 11/780 machines sharing a common memory are also examples of special purpose hardware configurations, not generally applicable to the general data processing environment.

In contrast, the method of the present invention provides parallel execution on standard tightly-coupled MP configurations and does not require any special purpose or dedicated hardware which cannot be used by other programs.

The method of the present invention not only operates in a standard hardware environment, but it also utilizes only standard system software and procedures as well. This contrasts with the preceding examples in the following manner:

1. The IBM 3838 requires special, non-FORTRAN programming techniques utilizing a special subsystem interface.
2. The FPS attached array processors require the use of a special compiler and a special linkage editor to prepare FORTRAN programs for execution.
3. The special purpose hardware configurations require special purpose software systems which are not applicable to the general data processing environment.
4. The HEP-1000 requires FORTRAN Language extensions.

SUMMARY OF THE INVENTION

Therefore, it is an object of the present invention to execute application programs written in a high level program language on multiprocessor systems in a Multiple Instruction/Multiple Data (MIMD) environment by a method including the steps of: initializing a MIMD environment in a data processing system by a call to an initialization routine from an application program; maintaining said environment until all independently executable portions of said application program have been executed; scheduling execution of a plurality of tasks representing independently executable portions of said application program; synchronizing execution and completion of said plurality of tasks until all said tasks have completed execution; terminating said MIMD environment on completion of all said tasks.

It is another object of the present invention to execute application programs written in a high level program language on multiprocessor systems in a Multiple Instruction/Multiple Data (MIMD) environment by a method as above including the further steps of: obtaining values for parameters specified in a control statement; building a map of a load module comprising said plurality of tasks; building an event list for use by said synchronizing step; building a plurality of subtask control blocks, there being one subtask control block for each subtask; building a plurality of argument lists, there being one argument list for each subtask; issuing an attach command for each said subtask; waiting for all attached subtasks to complete initialization.

It is yet another object of the present invention to execute application programs written in a high level program language on multiprocessor systems in a Multiple Instruction/Multiple Data (MIMD) environment by a method as above including the further steps of: obtaining subroutine name and arguments of subroutine to be scheduled; locating a free subtask to service said subroutine to be scheduled; indicating a busy subtask control block for said subroutine; returning to a calling routine to schedule other subroutines until all said subroutines have been scheduled.

It is yet another object of the present invention to execute application programs written in a high level program language on multiprocessor systems in a Multiple Instruction/Multiple Data (MIMD) environment by a method as above including the further steps of: entering information in said event list for each busy subtask; waiting until all busy subtasks have completed; indicating all subtasks not busy and exiting said synchronizing step.

It is yet another object of the present invention to execute application programs written in a high level program language on multiprocessor systems in a Multiple Instruction/Multiple Data (MIMD) environment by a method as above including the further steps of: issuing a detach command for each subtask; marking a subtask control block to indicate a terminated operation for each subtask.

Accordingly, a method for executing application programs written in a high level program language on tightly coupled multiprocessor systems in a Multiple Instruction/Multiple Data (MIMD) environment includes the steps of: initializing a MIMD environment in a data processing system by a call to an initialization routine from an application program; maintaining the MIMD environment until all independently executable portions of the application program have been executed; scheduling execution of those tasks representing independently executable portions of the application program; synchronizing execution and completion of the tasks until all tasks have completed execution; terminating the MIMD environment on completion of all the tasks.

The foregoing and other objects, features and advantages of the invention will be apparent from the more particular description of the preferred embodiments of the invention, as illustrated in the accompanying drawing.

BRIEF DESCRIPTION OF THE DRAWING

FIG. 5 is a flow diagram of the termination process of the method according to the present invention.

In the drawing, like elements are designated with similar reference numbers, and identical elements in different specific embodiments are designated by identical reference numbers.

DESCRIPTION OF A PREFERRED EMBODIMENT OF THE INVENTION

Figure 1:
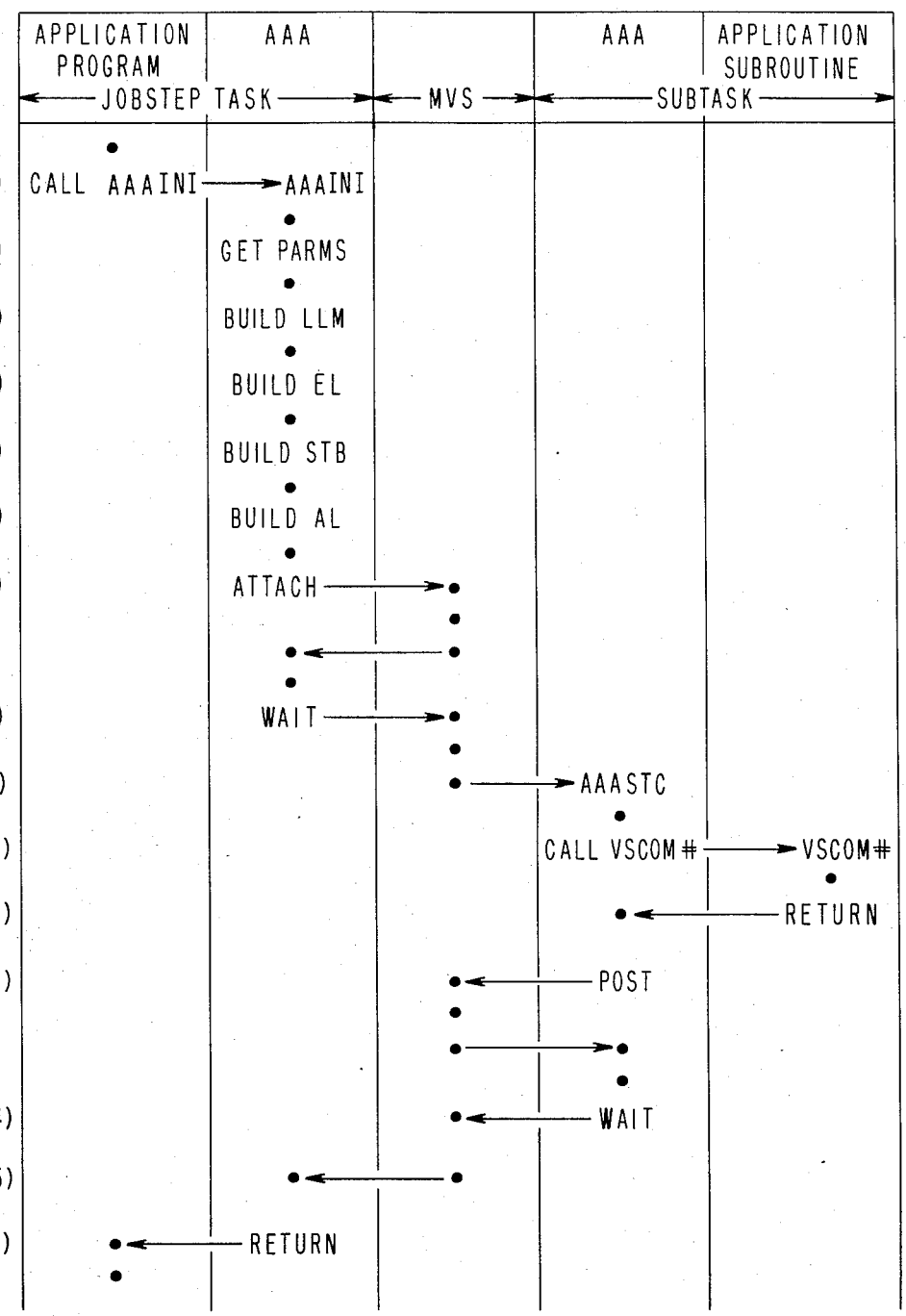
FIG. 1 is a flow diagram of the initialization process of the method according to the present invention.

The method of the present invention consists of four VS FORTRAN-callable subroutines, an interface subroutine for controlling the subtasks and several utility subroutines which may be executed on a multiprocessing computer system such as an IBM 3084 with appropriate storage capacity and Input/Output devices. The method of the present invention is implemented in PL/S III program language. The VS FORTRAN-callable subroutines are the FORTRAN application's interface to the method of the present invention facilities. These subroutines are:

AAAINI: AAAINI is the routine which creates the MIMD environment by building a MVS subtask structure.

AAAEXE: AAAEXE is the routine which schedules FORTRAN programs for execution in the MIMD environment. These subroutines can be executed independently of and in parallel with the main FORTRAN application program and each other.

AAASYN: AAASYN is the routine which synchronizes the main FORTRAN application program with the completion of the FORTRAN subroutines executing in the MIMD environment.

AAATRM: AAATRM is the routine which terminates the MIMD environment and returns the main FORTRAN application program to SISD operation.

The interface program for controlling the subtasks is:

AAASTC: AAASTC is the routine which controls the subtask under which FORTRAN subroutines in the MIMD environment execute. This routine provides the CALL/RETURN interface between the main FORTRAN application program and the MIMD FORTRAN subroutines. AAASTC also provides the FORTRAN error handling environment for the MIMD FORTRAN subroutine.

1.1.1 PREPARATION

A FORTRAN application program which uses the preferred embodiment of the invention is prepared (by the programmer) as two MVS load modules. The programmer identifies parallelizable code in the FORTRAN program, reorganizes this code into FORTRAN subroutines, removes the subroutines from the main program and places those subroutines in a separate load module of parallel executable subroutines. (See FIG. 2) The first load module is used by the jobstep task and contains:

- The FORTRAN main program.
- Any FORTRAN subroutines which are executed serial with the main program.
- The four FORTRAN-callable routines.
- Other library routines which are automatically included by the linkage editor.

The main FORTRAN routine must contain a CALL to AAAINI to initialize the MIMD environment. CALLs to AAAEXE and AAASYN can be placed in either the main FORTRAN routine or any of the serial subroutines to control the execution and synchronization of the MIMD subroutines. The location of these CALLs is dependent on the logic of the application program. A CALL to AAATRM should be placed at a point in the application program where the MIMD environment is no longer required. This CALL allows the application program to terminate normally.

The second load module is used by the subtasks and contains:

- The AAASTC routine.
- The FORTRAN subroutines which are to be executed in the MIMD environment.
- Other FORTRAN library routines which are automatically included by the linkage editor.

The parallel FORTRAN subroutines, when invoked, must be capable of executing independently of and in parallel with the main FORTRAN application program between the CALL to AAAEXE which scheduled the MIMD subroutine and the next CALL to AAASYN. The MIMD subroutine must also be capable of executing independently of and in parallel with any other MIMD subroutine which may be scheduled concurrently by the main application program.

1.1.2 EXECUTION OF THE METHOD OF THE PRESENT INVENTION

A FORTRAN job which uses the method of the present invention is submitted to MVS like any other FORTRAN job. A sample of JCL which could be used follows.

```
//GO        EXEC  PGM=AAAPGM,PARM='MIMDLM,
                  4',REGION=1000K
//STEPLIB   DD    DD=KGN.AAALIB.LOAD,DISP=
                  SHR
//AAALM     DD    DD=KGN.AAALIB.LOAD,DISP=
                  SHR
//FTnnFOOx  DD    Other DD Statements
                  As required by the
                  Application Program
```

In the preceding example, "MIMDLM" is the member name in AAALIB of the load module which contains the MIMD FORTRAN subroutines and "4" is the number of subtasks required. The AAALIB DD statement must point to the same library as the STEPLIB DD statement.

1.1.2.1 INITIALIZATION OF THE METHOD OF THE PRESENT INVENTION

FIG. 1 shows the flow of the process. The numbers (n) at the left side of the figure show the sequence of the process. The headings across the top show the environment in which the step is carried out. The following description explains each step of the process.

(1) AAAINI is called by the application program to create an MIMD environment.

(2) An internal subroutine is called to get the values specified in the PARM= field of the EXEC statement. These values are the name of the member in the library which contains the subtask load module and the number of subtasks to be created.

(3) An internal subroutine is called to build a map (LMM) of subroutines within the subtask load module. This map contains the name and the displacement from AAASTC for each external entry point in the load module.

(4) An event list (EL) is built. The EL is used by AAASYN when synchronizing the main application program with the MIMD subroutines.

(5) Subtask control blocks (STBs) are built. One STB is built for each subtask being created.

(6) An internal subroutine is called to build argument lists (ALs). One AL is built for each subtask being created.

(7) An MVS ATTACH macro is issued for each subtask being created. the ATTACH macro uses the library member name obtained in step (2) as the load module for the subtask. The address of the STB associated with each ATTACH is passed to the subtask as an argument.

(8) For each ATTACH macro issued, MVS returns the address of the task control block (TCB) created for the subtask.

(9) AAAINI makes an internal call to AAASYN to WAIT for all the ATTACHED subtasks to complete initialization.

Steps (10) through (14) are performed independently by each subtask that was attached.

(10) The MVS dispatcher gives control to the subtask at the entry point to AAASTC.

(11) VSCOM# is called to initialize the FORTRAN environment for the subtask.

(12) When VSCOM# returns to AAASTC, the FORTRAN environment has been successfully initialized.

(13) The completion ECB in the subtask's STB is POSTed to show that initialization for this subtask is complete.

(14) A WAIT macro is issued on the work ECB in the subtask's STB putting the subtask into the wait state until work is scheduled for it.

(15) After all of the subtasks have posted their respective completion ECBs, MVS returns control to AAASYN (see step 9) which in turn returns to AAAINI.

(16) AAAINI returns to its caller and initialization is complete.

Figure 2:
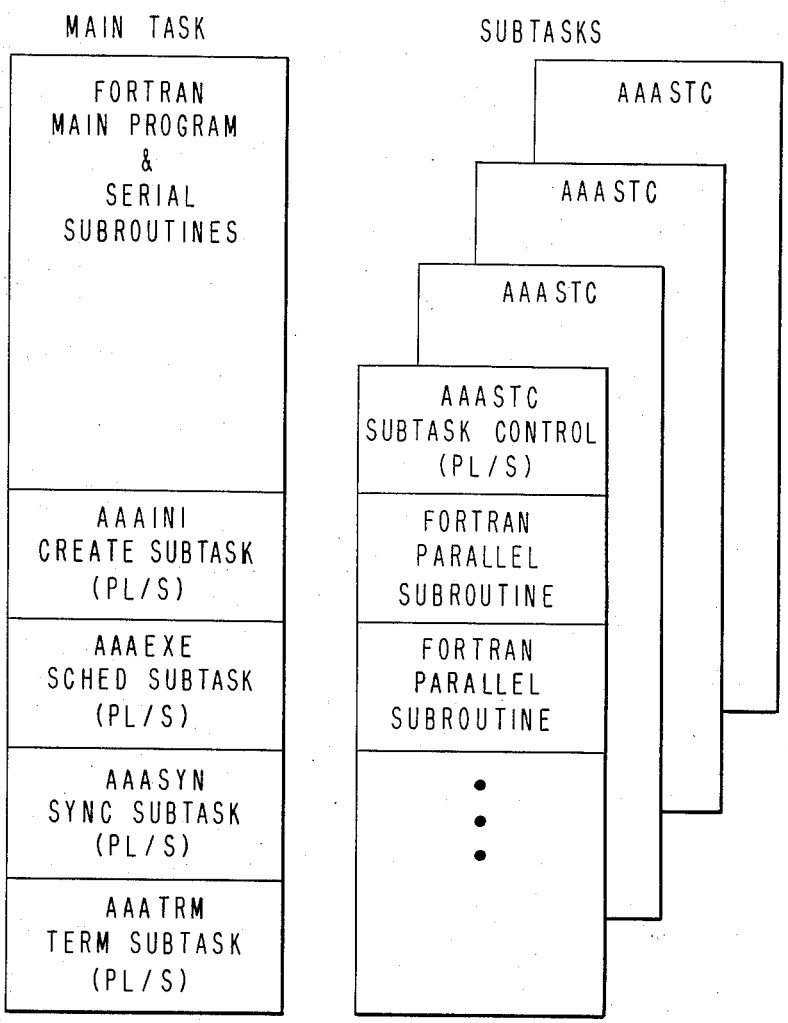
FIG. 2 is a diagram of post initialization task structure according to the method according to the present invention.

FIG. 2 shows the MVS task structure after initialization has completed. The main task (jobstep task) is active and executing the load module containing the main FORTRAN program, the serial subroutines and the four FORTRAN-callable routines. The subtasks are in wait state. A copy of the load module containing AAASTC and the FORTRAN MIMD subroutines is being used by each subtask.

Figure 3:
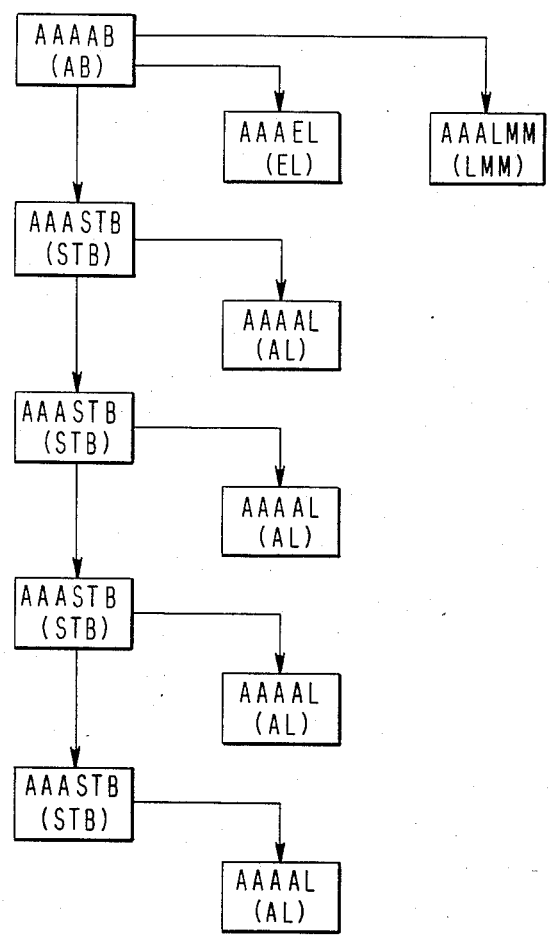
FIG. 3. is a diagram of a control block structure generated during the initialization process of the method according to the present invention.

FIG. 3 shows the control block structure that was built during initialization. The anchor block (AB) is a control section that was automatically included in the main task load module by the linkage editor. The remaining control blocks were created during initialization.

1.1.2.2 SCHEDULING AND SYNCHRONIZATION

Figure 4:
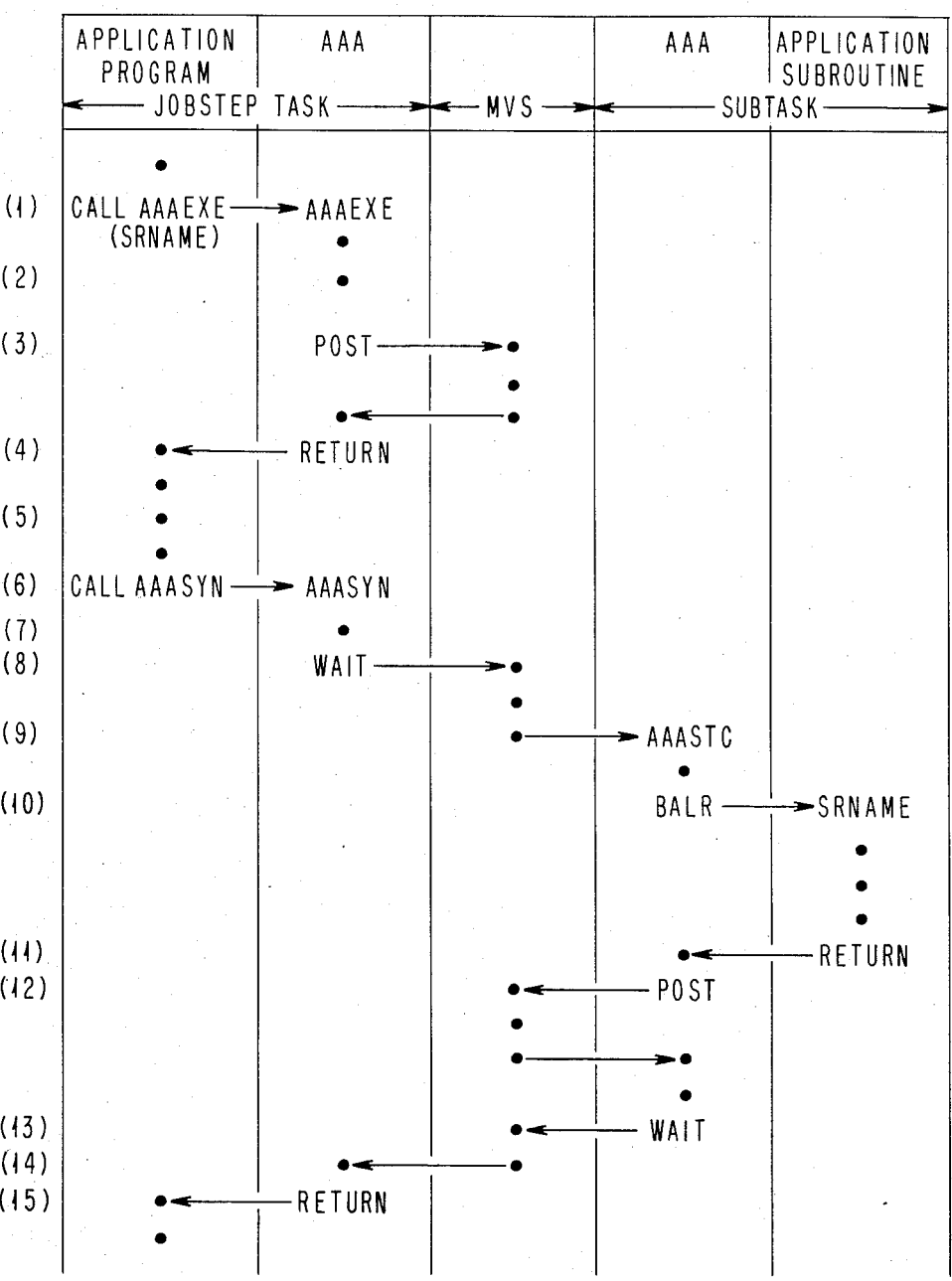
FIG. 4 is a flow diagram of the execution of scheduling and synchronizing tasks according to the present invention.

FIG. 4 shows the flow of the scheduling and synchronization process. The numbers (n) at the left side of the figure show the sequence of the process. The headings across the top show the environment in which the step is carried out. The following description explains each step of the process.

(1) When the main FORTRAN program or one of its serial subroutines wants to schedule a MIMD FORTRAN subroutine it issues a call to AAAEXE to schedule the MIMD subroutine. The name of the MIMD subroutine (srname) and the arguments for that subroutine are passed as arguments on the call to AAAEXE.

(2) AAAEXE locates a free subtask to service the request. The address of the MIMD subroutine and the argument list that will be used by AAASTC to call the MIMD subroutine is placed in the argument list (AL) control block of that subtask. The load module map (LMM) is used to translate the subroutine name to the address on the MIMD subroutine in the subtask environment.

(3) The subtask's STB is marked busy and the work ECB in the STB is posted.

(4) AAAEXE returns to its calling routine.

(5) The FORTRAN application program is free to schedule additional MIMD subroutines or it may do other serial work. If additional MIMD subroutines are scheduled steps (1) through (4) are repeated for each subroutine scheduled.

(6) When the application program wants to synchronize its execution with the completion of the execution of the currently scheduled MIMD subroutines it calls AAASYN.

(7) AAASYN fills out the event list (EL) for all subtasks that are marked busy in their STB.

(8) AAASYN issues a WAIT macro using the EL completed in step (7). This causes MVS to put the jobstep task in the wait state until all subtasks that are busy POST their completion ECBs.

Steps (9) through (16) are processed by each subtask which was scheduled by steps (1) through (4) and may by performed any time after the POST in step (3) is done on the subtasks work ECB.

(9) MVS takes the subtask out of wait state and returns control to AAASTC.

(10) Using the entry point address and argument list contained in the subtasks AL, AAASTC links to the MIMD subroutine.

(11) After performing its work, the MIMD subroutine returns to AAASTC.

(12) AAASTC POSTs the completion ECB in its STB.

(13) AAASTC WAITs on the work ECB in its STB. MVS puts the subtask into the wait state.

(14) After all subtasks which where WAITed on in step (8) have POSTed their completion ECB, MVS returns control to AAASYN.

(15) AAASYN marks all the STBs as not busy and returns to its caller.

The sequence of scheduling a set of MIMD subroutines and then synchronizing on their completion as shown in FIG. 4 may be repeat as often as required by the application program.

1.1.2.3 TERMINATION

FIG. 5 shows the flow of the termination process. The numbers (n) at the left side of the figure show the sequence of the process. The headings across the top show the environment in which the step is carried out. The following description explains each step of the process.

(1) When the MIMD environment is no longer required the application program terminates the MIMD environment by calling AAATRM.

(2) AAATRM makes an internal call to AAASYN which causes the jobstep task to wait until all subtasks have completed their last scheduled operation.

(3) The DETACH macro is issued for each subtask.

(4) The anchor block (AB) is marked to show that the MIMD environment has been terminated.

(5) AAATRM returns to its caller.

It should be understood that the various FORTRAN and MVS commands, macros, control block structures and task structures used in describing the preferred embodiment of the present invention, are well known to those skilled in the art and are described in the following published documents:

VS FORTRAN Applications Program Guide IBM Pub. No. SC26-3985-4

IBM System 370: Introduction to OS/VS2 Release 2 No. GC28-0661

IBM System 370: OS/VS2 Supervisor Services and Macro Instructions Form No. GC28-0683.

IBM System 370: MVS/XA Supervisor Services and Macro Instructions Form No. GC28-1154.

Thus, while the invention has been described with reference to preferred embodiments thereof, it will be understood by those skilled in the art that various changes in form and details may be made without departing from the scope of the invention.

What is claimed is:

1. A method for executing a program written in an application program language on a multiprocessor data processing system in a Multiple Instruction/Multiple Data (MIMD) environment including the steps of: initializing an MIMD environment in a data processing system by a call to an initialization routine from an application program; maintaining said environment until all independently executable portions of said application program have been executed; scheduling execution of a plurality of tasks representing independently executable portions of said application program; synchronizing execution and completion of said plurality of tasks until all said tasks has completed execution; terminating said MIMD environment on completion of all said tasks.

2. A method according to claim 1, wherein said initializing step further comprises the steps of: obtaining values for parameters specified in a control statement; building a map of a load module comprising said plurality of tasks; building an event list for use by said synchronizing step; building a plurality of subtask control blocks, there being one subtask control block for each subtask; building a plurality of argument lists, there being one argument list for each subtask; issuing an attach command for each said subtask; waiting for all attached subtasks to complete initialization.

3. A method according to claim 1, wherein said scheduling step further comprises the steps of: obtaining subroutine name and arguments of subroutine to be scheduled; locating a free subtask to service said subroutine to be scheduled; indicating a busy subtask control block for said subroutine; returning to a calling routine to schedule other subroutines until all said subroutines have been scheduled.

4. A method according to claim 1, wherein said synchronizing step further comprises the steps of: entering information in said event list for each busy subtask; waiting until all busy subtasks have completed; indicating all subtasks not busy and exiting said synchronizing step.

5. A method according to claim 1, wherein said terminating step further comprises the steps of: issuing a detach command for each subtask; marking a subtask control block to indicate a terminated operation for each subtask.

* * * * *